United States Patent
Li et al.

(10) Patent No.: US 12,174,704 B2
(45) Date of Patent: *Dec. 24, 2024

(54) RESET DEVICE AND DISPLAY DEVICE

(71) Applicant: Hisense Visual Technology Co., Ltd., Shandong (CN)

(72) Inventors: Xiaolong Li, Shandong (CN); Juncai Yu, Shandong (CN); Yanjie Zheng, Shandong (CN)

(73) Assignee: Hisense Visual Technology Co., Ltd., Shandong (CN)

( * ) Notice: Subject to any disclaimer, the term of this patent is extended or adjusted under 35 U.S.C. 154(b) by 139 days.

This patent is subject to a terminal disclaimer.

(21) Appl. No.: 18/161,482

(22) Filed: Jan. 30, 2023

(65) Prior Publication Data
US 2023/0168967 A1 Jun. 1, 2023

Related U.S. Application Data

(63) Continuation of application No. 17/231,335, filed on Apr. 15, 2021, now Pat. No. 11,593,214, which is a (Continued)

(30) Foreign Application Priority Data

Mar. 13, 2019 (CN) .......................... 201910189072.8

(51) Int. Cl.
*G06F 11/14* (2006.01)
*G06F 11/22* (2006.01)

(52) U.S. Cl.
CPC ...... *G06F 11/1441* (2013.01); *G06F 11/2284* (2013.01); *G06F 11/1433* (2013.01)

(58) Field of Classification Search
CPC ............. G06F 11/0733; G06F 11/1417; G06F 11/1433; G06F 11/1438; G06F 11/1441;
(Continued)

(56) References Cited

U.S. PATENT DOCUMENTS

| 5,680,599 A | 10/1997 | Jaggar |
| 6,864,920 B1 | 3/2005 | Kindt et al. |
| 2017/0047921 A1 | 2/2017 | Kubota et al. |

FOREIGN PATENT DOCUMENTS

| CN | 201222769 Y | 4/2009 |
| CN | 101556494 A | 10/2009 |

(Continued)

OTHER PUBLICATIONS

Chinese First Office Action, mailed Jan. 15, 2020, from Chinese App. No. 201910189072.8.
(Continued)

*Primary Examiner* — Gabriel Chu
(74) *Attorney, Agent, or Firm* — Workman Nydegger (57) ABSTRACT

The disclosure provides a reset device and a display device. The reset device comprises a processor, a reset circuit and a button. The reset circuit electrically connects to the processor and the button. When the button is not pressed, the processor acquires a first level signal from the reset circuit; when the button is pressed, if the processor cannot recognize the second level signal while acquiring the second level signal from the reset circuit, the display device is restarted; and during or after restart operation for the display device, if the reset circuit detects that the first level signal and the second level signal which are output by the reset circuit before and after the button is pressed are different, software fault recovery operation is performed on the display device.

17 Claims, 7 Drawing Sheets

```
receiving a reset signal generated by a third terminal of the reset circuit
when the button is pressed, acquiring a second level different from the first
level through the fourth terminal of the reset circuit, where the first level is    — S101
a level output by the fourth terminal of the reset circuit when the button is
                                not pressed
```

```
performing a reset                          performing a crash elimination
operation for the display                   operation and a reset operation
device when determining      — S1021        for the display device when       — S1022
that the first level and the                determining that the first level
second level are different                  and the second level are equal
```

Related U.S. Application Data continuation of application No. 16/685,662, filed on Nov. 15, 2019, now Pat. No. 11,010,252, which is a continuation of application No. PCT/CN2019/115801, filed on Nov. 5, 2019.

(58) Field of Classification Search
CPC .. G06F 11/162; G06F 11/2284; H04N 17/004
See application file for complete search history.

(56) References Cited

FOREIGN PATENT DOCUMENTS

| | | |
|---|---|---|
| CN | 201589807 U | 9/2010 |
| CN | 102186041 A | 9/2011 |
| CN | 102681907 A | 9/2012 |
| CN | 203590327 U | 5/2014 |
| CN | 103905756 A | 7/2014 |
| CN | 204536998 U | 8/2015 |
| CN | 107506251 A | 12/2017 |
| CN | 107704067 A | 2/2018 |
| CN | 109982147 A | 7/2019 |

OTHER PUBLICATIONS

International Search Report, mailed Feb. 20, 2020, from App. No. PCT/CN2019/115801.
European Extended Search Report, mailed Nov. 4, 2022, from EP App. No. 19919368.1.
U.S. Non-Final Office Action, mailed Jul. 6, 2022, from U.S. Appl. No. 17/231,335.

RESET DEVICE AND DISPLAY DEVICE

The application is a continuation application of U.S. patent application Ser. No. 17/231,335, filed on Apr. 15, 2021, which is a continuation application of U.S. patent application Ser. No. 16/685,662, filed on Nov. 15, 2019, which is a continuation application of PCT Patent Application No. PCT/CN2019/115801, filed on Nov. 5, 2019. The PCT Patent Application claims the priority to Chinese Patent Application No. 201910189072.8, filed on Mar. 13, 2019. The above-mentioned patent applications are hereby incorporated by reference in their entireties.

FIELD

The disclosure relates to display field, in particular to a reset device and a display device.

BACKGROUND

Users often encounter various malfunctions during displaying on a display device such as a television. Most of the malfunctions are resolved by using a reset button such as a reset circuit comprising a button, so that the display device can be restarted by a processor in the display device, and restored to normal. For example, a system on chip (SOC) of a television can restart the television. However, a display device cannot get back to normal service even if the display device is restarted for some malfunctions.

SUMMARY

The disclosure provides a reset device and a display device.

In the first aspect, embodiments of the disclosure provide a reset device, including:
- a processor, including a first terminal and a second terminal;
- a reset circuit, including a third terminal, a fourth terminal and a fifth terminal; and
- a button, including an output terminal, where
- the first terminal of the processor is connected with the third terminal of the reset circuit, the second terminal of the processor is connected with the fourth terminal of the reset circuit, and the fifth terminal of the reset circuit is connected with the output terminal of the button;
- the reset circuit is configured to output a first level signal to the second terminal of the processor through the fourth terminal of the reset circuit when the button is not pressed, and transmit a reset signal to the first terminal of the processor through the third terminal of the reset circuit and output a second level signal different from the first level signal to the second terminal of the processor through the fourth terminal of the reset circuit when the reset circuit detects that the button is pressed;
- the processor is configured to determine whether the second level signal is able to be identified by the processor when the second level signal is acquired by the second terminal of the processor from the fourth terminal of the reset circuit, and in response to the acquired second level signal not being able to be identified, restart a display device; and
- the processor is further configured to determine whether the second level signal is able to be identified again during or after the restart process of the display device, in response to the second level signal being able to be identified and the identified second level signal being different from the first signal level, determine no software fault existing in the display device, and restart the display device.

In some embodiments, the processor is further configured to determine whether the second level signal is able to be identified by the processor when the second level signal is acquired by the second terminal of the processor from the fourth terminal of the reset circuit, and in response to the acquired second level signal being identified and the identified second signal level being different from the first signal level, determine no software fault existing in the display device and restart the display device.

In some embodiments, the reset circuit includes a first circuit, a second circuit and a third circuit;
- an input terminal of the first circuit is connected with the output terminal of the button; an output terminal of the first circuit is connected with an input terminal of the second circuit and an input terminal of the third circuit; an output terminal of the second circuit is connected with the first terminal of the processor; and an output terminal of the third circuit is connected with the second terminal of the processor;
- the first circuit is configured to output a third level signal to the second circuit and the third circuit respectively when the button is not pressed;
- the second circuit is configured to output a non-reset signal different from the reset signal in amplitude to the processor according to the third level signal;
- the processor is configured to acquire the first level signal from the third circuit according to the non-reset signal, where the first level signal is generated by the third circuit according to the third level signal;
- the first circuit is further configured to output a fourth level signal to the second circuit and the third circuit when the button is pressed;
- the second circuit is further configured to output the reset signal to the processor according to the fourth level signal;
- the processor is further configured to acquire the second level signal from the third circuit according to the reset signal, where the second level signal is generated by the second circuit according to the fourth level signal.

In some embodiments, the third circuit includes a first resistor, a capacitor, a second resistor, a third resistor, a diode, a first triode, a second triode and a fourth resistor;
- where a first terminal of the first resistor is connected with a second terminal of the processor; a second terminal of the first resistor is connected with a first terminal of the capacitor, an emitter of the first triode, a first terminal of the second resistor and a first terminal of the third resistor; a second terminal of the capacitor is grounded; a second terminal of the second resistor is connected with a preset level signal; a second terminal of the third resistor is connected with a base of the first triode, a collector of the second triode and an anode of the diode; a base of the second triode is connected with a collector of the first triode and a first terminal of the fourth resistor; a second terminal of the fourth resistor and an emitter of the second triode are grounded; and a cathode of the diode is connected with the output terminal of the first circuit.

In some embodiments, the processor is further configured to input a zero level signal to the fourth terminal of the reset circuit in response to determining that the first level signal is different from the second level signal.

In some embodiments, the processor is further configured to perform a software fault recovery operation for the display device, and the software fault recovery operation includes at least one of software initial version recovery, incompatible application uninstallation, or cache cleanup.

In the second aspect, the embodiments of the disclosure provide a display device, including:
- a display screen, configured to display image data; and
- a reset device, in communication with the display screen, where the reset device includes:
- a processor, including a first terminal and a second terminal;
- a reset circuit, including a third terminal, a fourth terminal and a fifth terminal; and
- a button, including an output terminal; where the first terminal of the processor is connected with the third terminal of the reset circuit, the second terminal of the processor is connected with the fourth terminal of the reset circuit, and the fifth terminal of the reset circuit and is connected with the output terminal of the button;

the reset circuit is configured to output a first level signal to the second terminal of the processor through the fourth terminal of the reset circuit when the button is not pressed, and transmit a reset signal to the first terminal of the processor through the third terminal of the reset circuit and output a second level signal different from the first level signal to the second terminal of the processor through the fourth terminal of the reset circuit when the reset circuit detects that the button is pressed;

the processor is configured to determine whether the second level signal is able to be identified by the processor when the second level signal is acquired by the second terminal of the processor from the fourth terminal of the reset circuit, and in response to the acquired second level signal not being able to be identified, restart the display device; and the processor is further configured to determine whether the second level signal is able to be identified again during or after the restart process of the display device, in response to the second level signal being able to be identified and the identified second level signal being different from the first signal level, determine that no software fault existing in the display device, and restart the display device.

In the third aspect, the embodiments of the disclosure provide a display device, including:
- a housing;
- a display screen, arranged on an inner surface of the housing;
- a main board, located in the housing and in connection with the display screen;
- a power board, located in the housing, and in connection with the main board and the display screen; and
- a reset device, arranged on the main board and configured to communicate with the display screen;

where the power board is configured to provide a power supply level for the main board and the display screen;

where the main board is configured to providing display related data for the display screen;

where the reset device includes:
- a processor, including a first terminal and a second terminal;
- a reset circuit, including a third terminal, a fourth terminal and a fifth terminal; and
- a button, including an output terminal; where the first terminal of the processor is connected with the third terminal of the reset circuit, the second terminal of the processor is connected with the fourth terminal of the reset circuit, and the fifth terminal of the reset circuit is connected with the output terminal of the button;

the reset circuit is configured to output a first level signal to the second terminal of the processor through the fourth terminal of the reset circuit when the button is not pressed, and transmit a reset signal to the first terminal of the processor through the third terminal of the reset circuit and output a second level signal different from the first level signal to the second terminal of the processor through the fourth terminal of the reset circuit when the reset circuit detects that the button is pressed;

the processor is configured to determine whether the second level signal is able to be identified by the processor when the second level signal is acquired by the second terminal of the processor from the fourth terminal of the reset circuit, and in response to the acquired second level signal not being able to be identified, restart the display device; and the processor is further configured to determine whether the second level signal is able to be identified again during or after the restart process of the display device, in response to the second level signal being able to be identified and the identified second level signal being different from the first signal level, determine that no software fault existing in the display device, and restart the display device.

In some embodiments, the processor is further configured to determine whether the second level signal is able to be identified by the processor when the second level signal is acquired by the second terminal of the processor from the fourth terminal of the reset circuit, and in response to the acquired second level signal being identified and the identified second signal level being different from the first signal level, determine no software fault existing in the display device and restart the display device.

In some embodiments, the reset circuit includes a first circuit, a second circuit and a third circuit;
- an input terminal of the first circuit is connected with an output terminal of the button; an output terminal of the first circuit is connected with an input terminal of the second circuit and an input terminal of the third circuit; an output terminal of the second circuit is connected with the first terminal of the processor; and an output terminal of the third circuit is connected with the second terminal of the processor;
- the first circuit is configured to output a third level signal to the second circuit and the third circuit respectively when the button is not pressed;
- the second circuit is configured to output a non-reset signal different from the reset signal in amplitude to the processor according to the third level signal;
- the processor is configured to acquire the first level signal from the third circuit according to the non-reset signal, where the first level signal is generated by the third circuit according to the third level signal;
- the first circuit is further configured to output a fourth level signal to the second circuit and the third circuit when the button is pressed;
- the second circuit is further configured to output the reset signal to the processor according to the fourth level signal; and the processor is further configured to acquire the second level signal from the third circuit according to the reset signal, where the second level signal is generated by the second circuit according to the fourth level signal.

In some embodiments, the third circuit includes a first resistor, a capacitor, a second resistor, a third resistor, a diode, a first triode, a second triode and a fourth resistor; where a first terminal of the first resistor is connected with a second terminal of the processor; a second terminal of the first resistor is connected with a first terminal of the capacitor, an emitter of the first triode, a first terminal of the second resistor and a first terminal of the third resistor; a second terminal of the capacitor is grounded; a second terminal of the second resistor is connected with a preset level signal; a second terminal of the third resistor is connected with a base of the first triode, a collector of the second triode and an anode of the diode; a base of the second triode is connected with a collector of the first triode and a first terminal of the fourth resistor; a second terminal of the fourth resistor and an emitter of the second triode are grounded; and a cathode of the diode is connected with the output terminal of the first circuit.

In some embodiments, the processor is further configured to input a zero level signal to the fourth terminal of the reset circuit in response to determining that the first level signal is different from the second level signal.

In some embodiments, the processor is further configured to perform a software fault recovery operation on display device, and the software fault recovery operation includes at least one of software initial version recovery, incompatible application uninstallation, or cache cleanup.

BRIEF DESCRIPTION OF THE DRAWINGS

In order to more clearly illustrate the embodiments of the disclosure, the drawings used in the embodiments will be briefly described below. Obviously, the drawings in the following description are just some embodiments of the disclosure, and other drawings may be obtained by those skilled in the art without any creative work.

DETAILED DESCRIPTION OF THE EMBODIMENTS

In order to make the objects, embodiments and advantages of the disclosure clearer, the embodiments in the disclosure will be clearly and completely described below with reference to the drawings in the disclosure. It is obvious that the described embodiments are a part of the embodiments of the disclosure, and not all of the embodiments. All other embodiments obtained by those of ordinary skill in the art based on the embodiments of the disclosure without creative work fall within the scope of the protection of the disclosure.

It should be noted that the terms 'first', 'second', 'third' and the like in the various parts of the embodiments of the disclosure and the drawings are used for distinguishing similar objects, and are not necessarily used for describing a specific order or sequence. It should be understood that the data used in this way may be interchanged where appropriate, so that the embodiments of the disclosure described herein can be implemented in an order other than those illustrated or described herein. In addition, the terms 'comprises', 'includes' and any variations thereof are intended to cover a non-exclusive inclusion, for example, a process, method, system, product or equipment that includes a series of steps or units is not necessarily limited to those steps or units and may include other steps or units not explicitly listed or inherent to the process, method, product or equipment.

The flow diagrams of the following embodiments are merely illustrative, not necessarily to include all of the contents and steps or perform in the order described. For example, some steps can be divided, some steps can be combined or partially combined, and thus the performing order can be modified as needed.

In some cases, a display device cannot work normally during software faults of a processor of the display device through related technologies.

For example, manufacturers usually push software upgrade versions to a display device for solving serious bugs (BUG), take the example of fixing a bug in a drive program in a double data rate (DDR) chip in a television, where, DDR chip is a key component of the television and used for storing various types of data.

During the push process of the software upgrade versions, it is inevitable that software upgrade of a display device may fail due to abnormal power failure, or due to forced power failure because the user is unwilling to upgrade the software, or the like. Usually, software upgrade failure is likely to cause malfunction of the display device due to drive programs in the DDR chip.

The SOC can run the program in the boot phase after an SOC is triggered by the hardware of the reset circuit to restart the television, and the SOC needs to perform data read-write operations with the DDR chip after the program in the boot phase finishes running. At this time, software in the television is in a crash state, that is, the drive program in the DDR chip is disordered, the SOC cannot perform the data read-writing operations with the DDR chip normally, consequently, the SOC cannot continue operating, and therefore the television fails to be turned on or is in a crash when the TV is started.

Therefore, when a software upgrade failure occurs in the display device, the software fault cannot be resolved by triggering a processor to restart the display device through a reset circuit to restore the display device to work normally.

Figure 1:
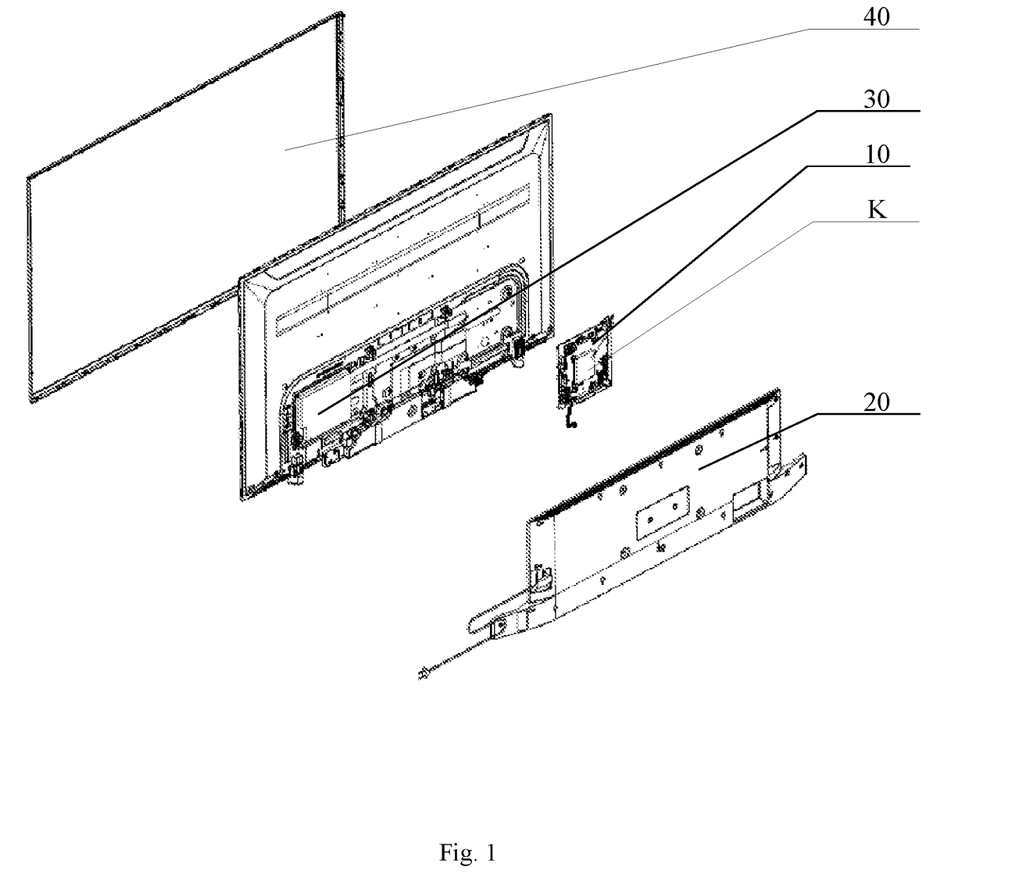
FIG. 1 is an explosive view of a display device according to some embodiments of the disclosure.

FIG. 1 is an explosive schematic diagram of a display device according to embodiments of the disclosure. As shown in FIG. 1, the display device may include a main board 10, a housing 20, a power board 30 and a display screen 40.

Where the power board 30 and the main board 10 are arranged in the housing 20, and the display screen 40 can be embedded in an inner surface of the housing 20. The power board 30 is connected with the main board 10 and the display screen 40 (the connection relationship is not shown in FIG. 1), and the power board 30 can supply power supply level signals to the main board 10 and the display screen 40. The main board 10 is connected with the display screen 40 (which is not shown in FIG. 1), and the main board 10 can provide data for the display screen 40, so that the display screen 40 normally displays data.

It should be noted that the display device mentioned in the embodiments of the disclosure may include, but is not limited to, a television, a mobile phone and a tablet computer. The specific implementation forms of the housing 20, the power board 30 and the display screen 40 are not limited by the embodiments. For convenience of description, the display device shown in FIG. 1 is an explosive view of a television. The television in FIG. 1 may include a television bracket and other parts in addition to the main board 10, the housing 20, the power board 30 and the display screen 40.

Figure 2:
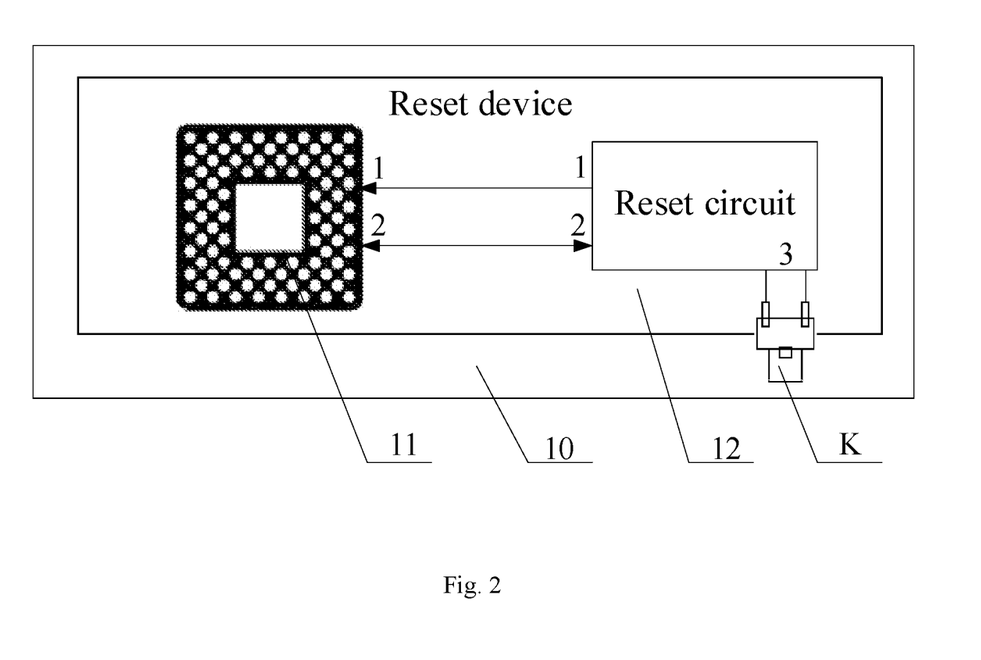
FIG. 2 is a structure schematic diagram of the reset device according to some embodiments of the disclosure.

As shown in FIG. 2, according to the embodiments of the disclosure, a reset device is arranged on the main board 10. The reset device may specifically include a processor 11, a reset circuit 12 and a button K. The button K may include a button switch or any other type of electric switch. A first terminal of the processor 11 is connected with a third terminal of a reset circuit 12, a second terminal of the processor 11 is connected with a fourth terminal of the reset circuit 12, and a fifth terminal of the reset circuit 12 is connected with an output terminal of the button K. In one implementation, the fifth terminal of the reset circuit 12 may include one or more physical pins, and the output terminal of the button K may include one or more physical pins corresponding to the fifth terminal of the reset circuit 12. For example but not limited to, referring to FIG. 2, the fifth terminal of the reset circuit 12 may include two physical pins, and the output terminal of the button K may include two physical pins corresponding to the fifth terminal of the reset circuit 12.

Wherein, the main board 10 may include one or more circuit boards. The processor 11, the reset circuit 12 and the button K can be arranged on the same circuit board, while the processor 11, the reset circuit 12 and the button K can also be arranged on different circuit boards.

For convenience of description, in some embodiments, the main board 10 in FIGS. 1 and 2 includes a circuit board, and the processor 11, the reset circuit 12 and the button K are arranged on the circuit board; the first terminal of the processor 11 is indicated by '1', the second terminal of the processor 11 is indicated by '2', the third terminal of the reset circuit 12 is indicated by '1', the fourth terminal of the reset circuit 12 is indicated by '2', and the fifth terminal of the reset circuit 12 is indicated by '3'. In general, the first terminal of the processor 11 is configured as a special reset, and may also be configured as an input/output (I/O) interface, and the second terminal of the processor 11 is configured as an I/O interface, which is not limited by the embodiments.

In addition, the number and type of the button K are not limited in the embodiments of the disclosure. The button K and the main board 10 can be configured in various positional relationships, specifically, the button K may protrude from a body of the housing 20 (the button K is shown in this manner in FIG. 2) for convenient operation or the button K may be flush with the edge of the housing 20 for preventing misoperation or the button K may also be arranged in the housing 20 for preventing misoperation.

Figure 3:
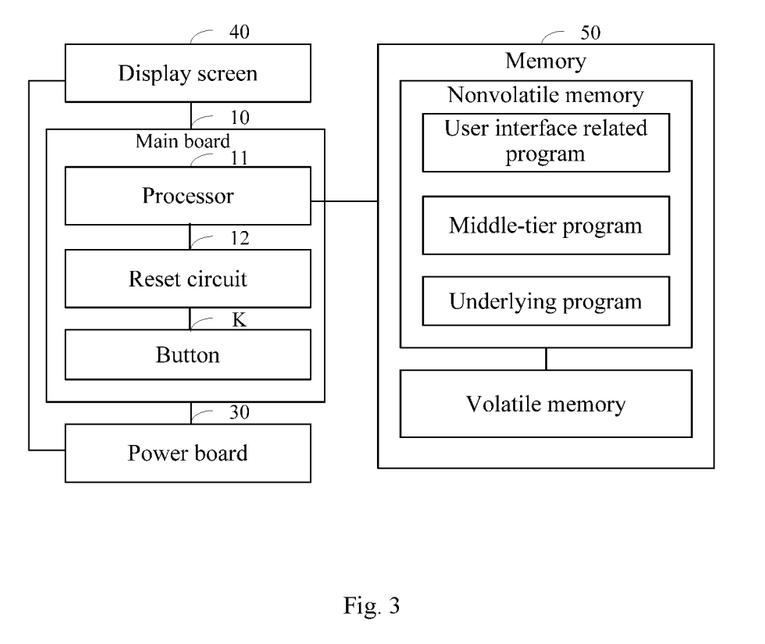
FIG. 3 is a structure schematic diagram of the display device according to some embodiments of the disclosure.

In some embodiments, as shown in FIG. 3, the display device may further include a memory 50 in addition to the main board 10, the housing 20 (which is not shown in FIG. 3), the power board 30 and the display screen 40, where the memory 50 may include a volatile memory and a nonvolatile memory. The nonvolatile memory stores software programs required for normal work of a display device, and the volatile memory provides the processor with an area for running the software programs.

The number and type of the volatile memory and the nonvolatile memory are not limited by the embodiments of the disclosure. For example, a flash memory may be used as the nonvolatile memory, and a double data rate synchronous dynamic random access memory (DDR SDRAM) may be used as the volatile memory.

Moreover, the specific implementation form of the software programs is not limited by the embodiments of the disclosure. Specifically, with reference to FIG. 3, the software program may generally include an underlying program, a middle-layer program and a user interface related program.

The underlying program includes a detection program for detecting a signal generated by the reset circuit 12, and a drive program, a start program and a reset program for modules such as a DDR memory, a Flash memory and a power amplifier in the display device. In some embodiments, the processor 11 can run the detection program in the DDR memory, so that the processor 11 has the function of detecting a signal generated by the reset circuit 12. The processor 11 can run the start program in the DDR memory, so that the processor 11 has the function of normally starting the display device. The processor 11 can run the reset program in the DDR memory, so that the processor 11 has the reset function, that is, the processor 11 can restart the display device (restarting the display device herein refers to starting the display device again).

The middle-layer program mainly includes an operating system of the display device. The operating system may include, but not limited to, Linux, Android and other systems, where, based on control of the operating system, the processor 11 can achieve the function of detecting the signal generated by the reset circuit 12, and can also achieve the function of starting the display device.

The user interface can be displayed through the display screen 40, where a user can operate the display device through a device such as a remote controller, a mobile phone and a tablet computer, or can directly touch the display screen 40 to complete the corresponding operation.

In addition, the specific contents of the underlying program and the middle-layer program are not limited to the above-described implementation forms.

Further, when images in the user interface displayed by the display screen 40 are stuck and do not respond to the user operation, and consequently the display device crashes when the TV is started, or the display device cannot be turned on due to the fact that the images in the user interface displayed by the display screen 40 cannot be normally displayed, an operator can reset the display device with the reset device. At this time, the operator can specifically press the button K, at which time the button K is in the pressed state; otherwise, the button K is in the unpressed state. Further, when the button K is not pressed, the reset circuit 12 can transmit a non-reset signal to the first terminal of the processor 11 through the third terminal of the reset circuit 12. When the button K is pressed, the reset circuit 12 can send a reset signal to the first terminal of the processor 11 through the third terminal of the reset circuit 12.

Where the button K can be pressed for a short time, or the button K can be pressed for several times in succession. The embodiments of the disclosure do not limit how to press the button K by the operator. The specific implementation forms of the non-reset signal and the reset signal are not limited in the embodiments of the disclosure, and the reset signal just is required to be different from the non-reset signal in amplitude. For example, if the non-reset signal is a high level signal, the reset signal is a low level signal; and if the non-reset signal is a low level signal, the reset signal is a high level signal.

Further, when receiving the non-reset signal, the processor 11 may acquire the first level signal from the fourth terminal of the reset circuit 12 through the second terminal of the processor 11, then the processor 11 may store the first level signal, that is, the first level signal is a level signal outputted by the fourth terminal of the reset circuit 12 when the display device is in the non-reset state.

It should be noted that the processor 11 may acquire the first level signal in real time, or may acquire the first level signal irregularly or periodically, or may acquire the first level signal after power-on. The mode of acquiring the first level signal by the processor 11 is not limited, and the processor 11 is just required to have stored the first level signal before the button K is pressed. In addition, the processor 11 may also store the first level signal in advance at a preset area so that the processor 11 can obtain the first level signal from the preset area when the first level signal is needed. The preset area may be in the memory 50 or may be in the storage area of the processor 11, which is not limited in the embodiments of the disclosure.

If no software fault occurs to the processor of the display device, the processor 11 may acquire a second level signal from the fourth terminal of the reset circuit 12 through the second terminal of the processor 11 when receiving the reset signal. Since the processor 11 has acquired the first level signal, the processor 11 can compare the amplitude of the first level signal and the amplitude of the second level signal.

When no software fault occurs to the display device, the processor 11 can operate normally, so that the processor 11 can identify the level signal change between the first level signal and the second level signal.

In some embodiments, when the processor 11 receives the reset signal, if the processor 11 determines that the first level signal and the second level signal are different, the processor 11 can detect the level signal change between the first level signal and the second level signal. Therefore, no software fault occurs to the processor of the display device, the processor 11 can directly conduct a restart operation for the display device at the time, and thus the restart requirement for the display device of the operator is met.

The restart operation process specifically includes the following steps: in order to avoid the self-locking of the reset circuit, the processor 11 can input a zero level signal to the fourth terminal of the reset circuit 12, so that the level signal of the fourth terminal of the reset circuit 12 is recovered from the second level signal to the first level signal, the display device is restarted, and thus a situation where the restarted processor 11 continues to acquire the second level signal from the fourth terminal of the reset circuit 12 and the need of misoperation for eliminating crash (for example, eliminating software faults) is avoided. According to the embodiments of the disclosure, the abnormal states that the display device is in a crash state during starting or after being started, or cannot be started or others are collectively referred to that the display device is in a crash state.

When a software fault occurs to the processor of the display device, the processor 11 cannot recognize the level signal change between the first level signal and the second level signal after receiving the reset signal due to the software fault, that is, the processor cannot acquire the level signal from the fourth terminal of the reset circuit 12, and the display device is usually in a start-crash state or is unable to be started.

The specific implementation forms of the first level signal and the second level signal are not limited in the embodiments of the disclosure. For example, the first level signal is a high level signal, while the second level signal is a low level signal; and the first level signal is a low level signal, while the second level signal is a high level signal. It should be noted that the level signals being different refers to the amplitude of the level signals being different.

When the processor 11 cannot detect the level signal change between the first level signal and the second level signal, that is, the level signal cannot be acquired from the fourth terminal of the reset circuit 12, the processor 11 restarts the display device. During the restart process of the display device or after restart, if the processor 11 acquires a second level signal different from the first level signal from the fourth terminal of the reset circuit through the second terminal of the processor, the processor 11 determines that a software fault occurs to the display device, and the processor 11 fixes the software fault. If the processor 11 has fixed the software fault during restart of the display device, the software fault may be fixed before restart (such as some software that affects restart), or may be fixed after restart (such as some software that does not affect restart).

It is understood by those skilled in the art that there are many reasons for software faults occurred in the display device, for example, whether software upgrade of the display device fails, whether applications (APPs) installed on the display device are compatible, whether buffer of the display device is insufficient, and whether there are too many junk files on the display device. Based on the description, the embodiments of the disclosure do not limit the specific implementation process of crash elimination operation, and the crash state of the display device is only needed to be eliminated through crash elimination operation.

In some embodiments, the processor 11 is configured to perform the following crash elimination operation sequentially on the display device: the processor restores the initial version of software at first, then uninstalls incompatible applications, and then cleans up the cache.

Specifically, the initial version of the software is restored, that is, the processor 11 can detect whether the software in the display device is updated before the display device is reset, and if so, the processor 11 can restore the software version of the display device to the initial version of the software.

Where, the initial version of the software can be either a software version set by a displaying device manufacturer or a normal working version of the display device before the display device is reset, which is not limited by the embodiments of the disclosure.

The cache is cleaned up, that is, the processor 11 can detect whether the storage space of the display device is sufficient. If not, the processor 11 can clean up the system cache in the display device. Then the processor 11 can detect whether the system junk files in the display device are excessive. If so, the processor 11 can clear the system junk files. Afterwards, the processor 11 can retain user data and clean up the cache generated by all applications.

According to the reset device provided by the embodiments of the disclosure, the third terminal of the reset circuit may transmit a reset signal to the processor when the button is pressed. When the processor receives the reset signal, if the processor acquires the second level signal different from the first level signal through the fourth terminal of the reset circuit, the processor may restart the display device, where the first level signal is a level signal outputted by the fourth terminal of the reset circuit when the button is not pressed. Further, when the processor determines that the first level signal is different from the second level signal, since the processor can identify the level signal change between the first level signal and the second level signal, no software fault occurs to the processor of the display device at the time, the processor can restart the display device, and therefore the display device is restarted. If the processor cannot acquire the level signal from the fourth terminal of the reset circuit 12 when receiving the reset signal, the processor 11 restarts the display device. During the restart process or after the display device is restarted, if the processor 11 acquires a second level signal different from the first level signal from the fourth terminal of the reset circuit through the second terminal of the processor, the processor 11 determines that a software fault occurs to the display device, and fixes the software fault.

According to some embodiments, the reset circuit outputs the first level signal to the second terminal of the processor through the fourth terminal of the reset circuit when the button is not pressed, and transmits a reset signal to the first terminal of the processor through the third terminal of the reset circuit and outputs the second level signal different from the first level signal to the second terminal of the processor through the fourth terminal of the reset circuit when the reset circuit detects that the button is pressed; the processor determines whether the second level signal can be identified when the second level signal is acquired from the fourth terminal of the reset circuit through the second terminal of the processor, and restarts the display device when the acquired second level signal cannot be identified; and the processor determines whether the second level signal can be identified again during the restart process or after the display device is restarted, determines that no software fault occurs to the processor of the display device when the acquired second level signal can be identified and the second level signal is different from the first level signal, and restarts the display device. The processor determines whether the second level signal can be identified by the processor when the second level signal is acquired from the fourth terminal of the reset circuit through the second terminal of the processor, determines that no software fault occurs to the processor of the display device when the acquired second level signal can be identified and the second level signal is different from the first level signal, and restarts the display device. Through the scheme, the problem that the display device cannot work normally during software faults of the processor of the display device through related technologies is solved, the display device including the reset device has the self-checking capability, and the user experience is improved.

In some embodiments, the reset circuit 12 may have various implementation forms, which are not limited in the embodiments of the disclosure, and the reset circuit 12 just needs to provide a corresponding level signal to the processor 11 before and after resetting the display device. For convenience of description, the specific structure of the reset circuit 12 will be described in detail below with reference to FIG. 4.

Figure 4:
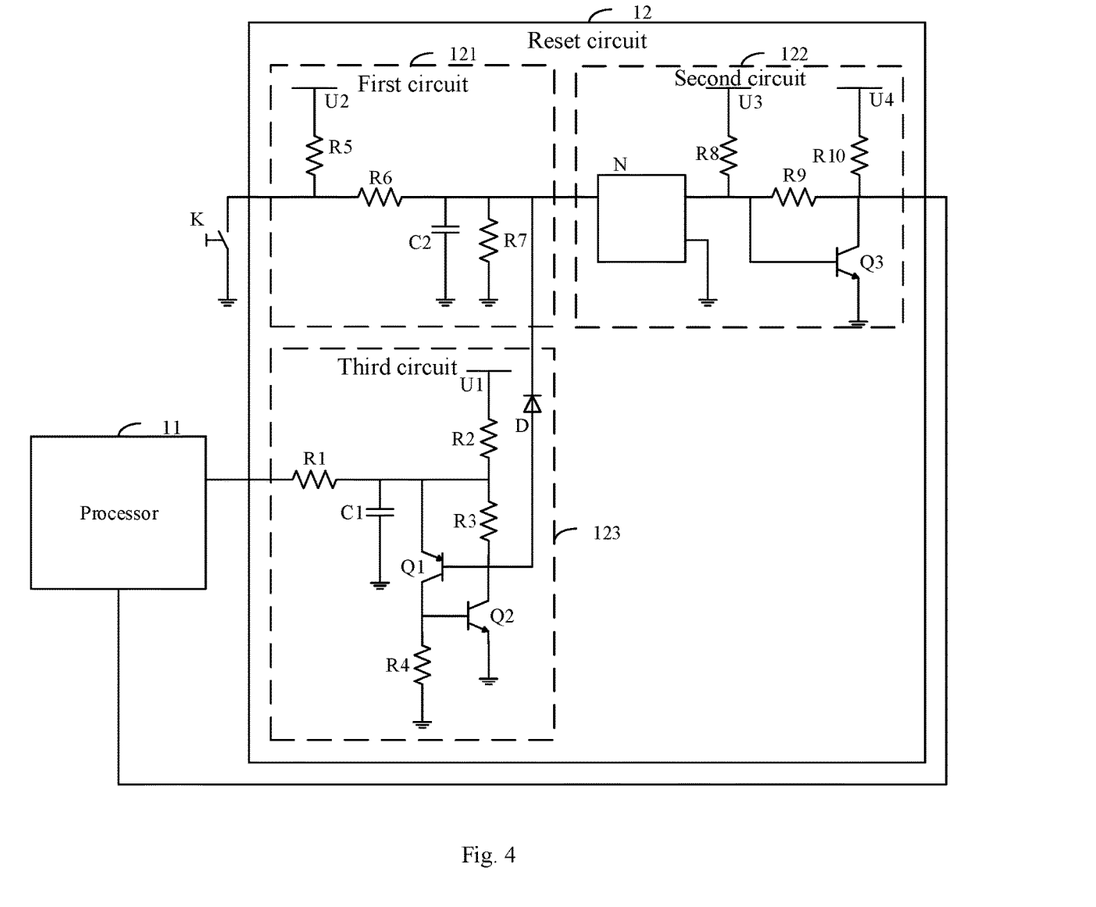
FIG. 4 is a first circuit diagram of the reset circuit according to some embodiments of the disclosure.

FIG. 4 is a circuit schematic diagram of the reset circuit 12 according to the disclosure. As shown in FIG. 4, in some embodiments, the reset circuit 12 can be divided into three parts which are the first circuit 121, the second circuit 122 and the third circuit 123 according to the implementation function of the reset circuit 12.

Where the input terminal of the first circuit 121 is connected with the output terminal of the button K and the first circuit 121 is used for detecting whether the button K is pressed by an user or not. Further, the output terminal of the first circuit 121 can transmit corresponding level signals to the second circuit 122 and the third circuit 123 by connecting with an input terminal of the second circuit 122 and an input terminal of the third circuit 123.

Specifically, when the button K is not pressed, the first circuit 121 may output a third level signal to the second circuit 122 and the third circuit 123 respectively. When the button K is pressed, the first circuit 121 can output a fourth level signal to the second circuit 122 and the third circuit 123 respectively.

Referring to FIG. 4, in some embodiments, the first circuit 121 may include a fifth resistor R5, a sixth resistor R6, a second capacitor C2 and a seventh resistor R7.

Where a first terminal of the button K is grounded; a second terminal of the button K is connected with a first terminal of the fifth resistor R5 and a first terminal of the sixth resistor R6; a third terminal of the button K is a pressing terminal; a second terminal of the fifth resistor R5 is connected with a second preset level signal U2 which may be provided by the power board 30 in the display device; a second terminal of the sixth resistor R6 is connected with a first terminal of the second capacitor C2, a first terminal of the seventh resistor R7, an input terminal of the second circuit 122 and an input terminal of the third circuit 123; and a second terminal of the second capacitor C2 and a second terminal of the seventh resistor R7 are grounded.

Since the operation of pressing the button K by the operator is an instantaneous operation, the second circuit 122 can usually be arranged in the reset circuit 12, the second circuit 122 can detect whether a level signal of the output terminal of the first circuit 121 changes. Then the output terminal of the second circuit 122 can transmit a non-reset signal or a reset signal to the processor 11 by being connected with the first terminal of the processor 11.

Specifically, when the second circuit 122 receives the third level signal, the second circuit 122 may output a non-reset signal to the processor 11 according to the third level signal. When the second circuit 122 receives a fourth level signal, the second circuit 122 may output a reset signal to the processor 11 according to the fourth level signal.

With reference to FIG. 4, in some embodiments, the second circuit 122 includes a voltage monitoring module N, an eighth resistor R8, a third triode Q3, a ninth resistor R9 and a tenth resistor R10.

Where an input terminal of the voltage monitoring module N is connected with an output terminal of the first circuit 121; an output terminal of the voltage monitoring module N is connected with a first terminal of the eighth resistor R8, a base of the third triode Q3 and a first terminal of the ninth resistor R9; a second terminal of the eighth resistor R8 is connected with a third preset level signal U3 which is provided by the power board 30 in the display device; a second terminal of the ninth resistor R9 is connected with a first terminal of the tenth resistor R10, a collector of the third triode Q3 and a first terminal of the processor 11; a second terminal of the tenth resistor R10 is connected with a fourth preset level signal U4 which is provided by the power board 30 in the display device; and an emitter of the third triode Q3 is grounded.

In some embodiments, the third circuit 123 is configured to determine whether the display device is in a crash state. An output of the third circuit 123 is connected with the second terminal of the processor 11, and the third circuit 123 changes a level signal output to the processor 11 according to whether a level signal of the output terminal of the first circuit 121 changes.

Specifically, when the third circuit 123 receives a third level signal, the third circuit 123 may generate a first level signal, and the processor 11 may acquire the first level signal through the third circuit 123 when receiving the non-reset signal for convenient storage. The third circuit 123 may generate a second level signal when receiving the fourth level signal, and thus the processor 11 may acquire the second level signal through the third circuit 123 when receiving the reset signal. Further, the processor 11 can detect the first level signal and the second level signal before and during resetting the display device respectively.

On the basis of the foregoing embodiment shown in FIG. 4, the first circuit 121, the second circuit 122 and the third circuit 123 may have various implementation forms, which are not limited by the embodiments of the disclosure. For convenience of explanation, the specific structure of the reset circuit 12 will be described in detail with reference to FIG. 4.

In some embodiments, the third circuit 123 includes a first resistor R1, a capacitor (namely a first capacitor) C1, a second resistor R2, a third resistor R3, a diode D, a first triode Q1, a second triode Q2 and a fourth resistor R4.

Where a first terminal of the first resistor R1 is connected with the second terminal of the processor 11; a second terminal of the first resistor R1 is connected with a first terminal of the capacitor C1, an emitter of the first triode Q1, a first terminal of the second resistor R2 and a first terminal of the third resistor R3; a second terminal of the capacitor C1 is grounded; a second terminal of the second resistor R2 is connected with a first preset level signal U1 which is provided by the power board 30 in the display device; a second terminal of the third resistor R3 is connected with a base of the first triode Q1, a collector of the second triode Q2 and an anode of the diode D; a base of the second triode Q2 is connected with a collector of the first triode Q1 and a first terminal of the fourth resistor R4; a second terminal of the fourth resistor R4 and an emitter of the second triode Q2 are grounded; and a cathode of the diode D is connected with an output terminal of the first circuit 121.

In addition, the third circuit 123 can also include one or more resistors. Since the third level signal outputted by the first circuit 121 to the third circuit 123 when the button K is not pressed is different from the fourth level signal outputted by the output terminal of the first circuit 121 to the third circuit 123 when the button K is pressed, the third level signal and the fourth level signal pass through the resistor, i.e. the same circuit structure, in the third circuit 123, and the third circuit 123 can output the first level signal and the second level signal which are different to the processor 11, so that the processor 11 conveniently detects whether the levels are different.

In a specific embodiment, a television is used as the display device, an SOC is used as the processor 11, and based on the specific structures of the first circuit 121, the second circuit 122 and the third circuit 123 shown in FIG. 4, the work process of the television specifically includes the steps below.

1. After the television is powered on with alternating current, the power board 30 in the television provides U2 to the first circuit 121, U3 and U4 to the second circuit 122, and U1 to the third circuit 123, where the levels of U1, U2, U3 and U4 are 3.3V, respectively.

2. After power-on at 3.3V, the level of the cathode of the diode D is 3.3V, and the level of the anode of the diode D is not higher than 3.3V, so that no current flows through the diode D. In addition, the non-reset signal output to the SOC through the second circuit 122 powered by 3.3V is a low level.

3. The levels of the base and emitter of the first triode Q1 (PNP triode) are 3.3V, and the first triode Q1 is in the cut-off state. There is no level on the base of the second triode Q2 (NPN triode), and the second triode Q2 is in the cut-off state. The level on the first terminal of the first resistor R1 is 3.3V, and the SOC can detect that the first level is 3.3V through the first terminal of the first resistor R1.

Furthermore, if the button K is not pressed after the TV is turned on normally, when the SOC receives a low level non-reset signal, since the level on the first terminal of the first resistor R1 is always a high level, the SOC determines that the television is in a turn-on state with the button K not being pressed by an operator, that is, the television is normally turned on.

4. If the operator presses the button K, the first terminal of the button K is grounded, and a low-level pulse is generated, so that the level on the anode of the diode D is higher than the level on the cathode of the diode D, and the diode D is turned on. In addition, the reset signal outputted to the SOC by the low-level pulse through the second circuit 122 is a high level.

5. After the diode D is turned on, the level on the emitter of the first triode Q1 is 1.3V, the level on the base of the first triode Q1 is 0.7V, and the first triode Q1 is turned on. After the first triode Q1 is turned on, the level of the base of the second triode Q2 is 0.7V due to the fourth resistor R4, and the emitter of the second triode Q2 is grounded, thus, a sufficient voltage difference is formed between the base and the emitter of the second triode Q2, and the second triode Q2 is turned on.

6. Since the first triode Q1 and the second triode Q2 are both turned on, the level on the first terminal of the first resistor R1 is changed from 3.3V before the button K is pressed to 0.7V, that is, the level on the first terminal of the first resistor R1 is changed into a second level.

7. When the SOC receives the high level reset signal and detects that the level on the first terminal of the first resistor R1 is a low level of 0.7V, the SOC determines that the operator uses the button K to request for restarting the television, and the SOC determines that the television is not in a crash state, so the SOC can determine that there is no software fault occurring to the television. Then, the SOC can input a level of 0V to the first terminal of the first resistor R1 at first, thus, the level on the first terminal of the first resistor R1 restores to a high level of 3.3V, and then a normal restart operation is performed.

8. When the SOC receives the high level reset signal, and the SOC cannot detect the level signal on the first terminal of the first resistor R1, the SOC restarts the television; for example, the SOC restarts the television when the SOC cannot detect the level signal on the first terminal of the first resistor R1 after receiving the high level reset signal for a preset time period. During or after the restart process of the television, the SOC detects the level signal on the first terminal of the first resistor R1. If the level signal is a low level signal, the SOC determines that the television is in a crash state before the television is restarted and/or determines that software faults occur to the television before the television is restarted.

Since the level on the cathode of the diode D restores to 3.3V when the operator releases the button K, no current flows through the diode D. Moreover, since the first triode Q1 and the second triode Q2 are both turned on when the button K is pressed, the first triode Q1 and the second triode Q2 remain the turn-on state after the button K is released, and the level on the first terminal of the first resistor R1 is always in the 0.7V state, that is, the first triode Q1 and the second triode Q2 are self-locked. Therefore, the level on the first terminal of the first resistor R1 will remain as a low level of 0.7 V. Further, if the SOC can detect that the level on the first terminal of the first resistor R1 during restarting the television is a low level of 0.7V, the SOC determines that software faults occur to the television, the SOC can input a level of 0V to the first terminal of the first resistor R1 at first, so that the level on the first terminal of the first resistor R1 is restored to the high level of 3.3V, and then the software faults of the television are fixed. Further, the SOC may restore the initial version of the software (step 1) at first, then uninstall the incompatible applications (step 2), and clean up the cache (step 3), so that the SOC fixes the software faults of the television. Afterwards, the SOC completes the restart operation.

Specifically, the television start process (namely the boot loader phase) includes the steps that step 1, an SOC may detect whether the software version in the television is upgraded before television restarts at first, if so, step 11 is performed; otherwise, step 2 is performed.

Step 11, the SOC reads the initial version of the software from the nonvolatile memory into the volatile memory, and then step 2 is performed.

Step 2, the SOC detects whether incompatible applications have been installed in the television before television restarts. If so, step 21 is performed; otherwise, step 3 is performed.

Step 21, the SOC uninstalls the incompatible applications, and then step 3 is performed.

Step 3, the SOC cleans up the cache. Specifically, the SOC detects whether the storage space of the television is sufficient at first; if not, the SOC can clean up the system cache in the television. Then, the SOC can detect if there are too many system junk files in the television; and if yes, the SOC can clear the system junk files. Then, the SOC can retain user data and clean up the cache in all applications.

In steps 7 and 8, the SOC may lower the level on the first terminal of the first resistor R1 at first, that is, the SOC inputs low-level pulse to the first terminal of the first resistor R1, thus, the level of the first terminal of the first resistor R1 is lowered to 0V, and the level on the emitter of the first triode Q1 is 0V, so that the first triode Q1 is turned off while the second triode Q2 is turned off. At the time, the level on the first terminal of the first resistor R1 is restored to 3.3V, and the second circuit 122 is restored to the initial state, so that the function of pressing the button K again to eliminate the software faults of the display device by the operator is not affected.

Further, by arranging the reset circuit 12, the processor 11 can memorize whether the operator presses the button K, so that the processor 11 determines whether the display device is normally started or started by resetting, and the processor 11 can also determine whether the level changes or not, then determine whether the display device is in a crash state, and in addition, when the processor 11 determines that the display device is not in a crash state, the processor 11 can perform a normal restart operation for the display device. When the processor 11 determines that the display device is in a crash state, the processor 11 may perform a crash elimination operation and a restart operation for the display device.

Figure 5:
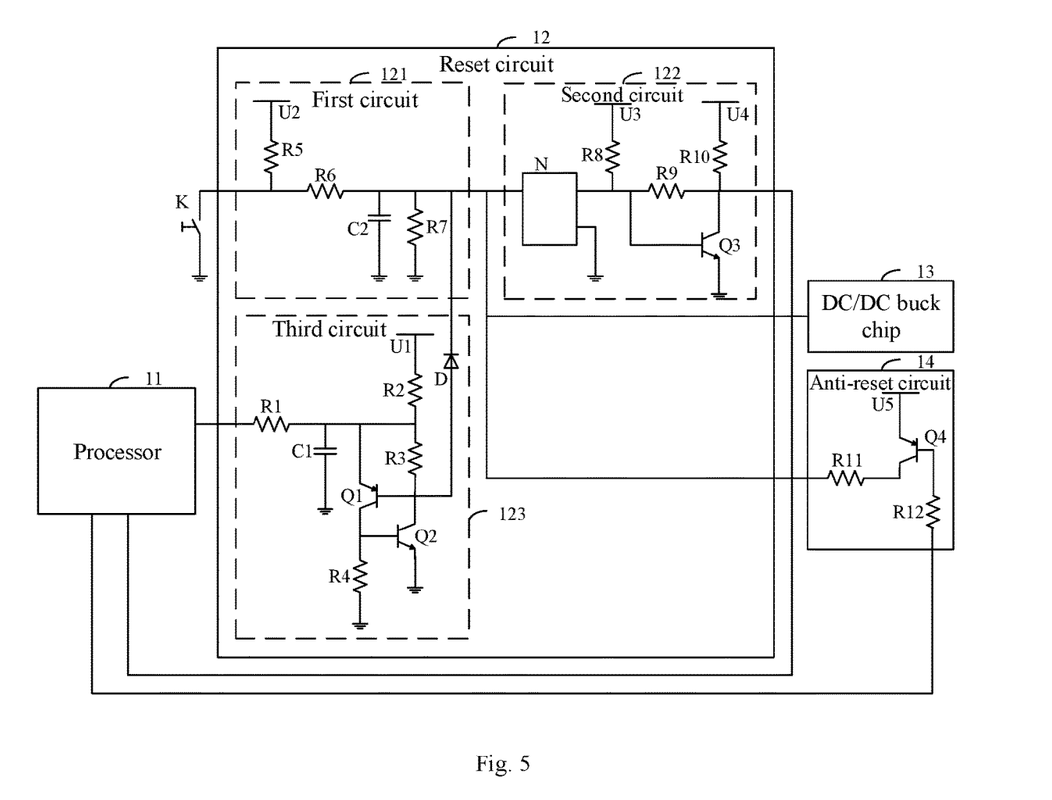
FIG. 5 is a second circuit schematic diagram of the reset circuit according to some embodiments of the disclosure.

In addition, on the basis of the above embodiment of FIG. 4, as shown in FIG. 5, the reset device may be further provided with at least one DC-DC buck chip 13 on the main board 10, where an output terminal of any one of the DC-DC buck chips 13 is connected with the input terminal of the second circuit 122 and used for inputting the fifth level to the second circuit 122.

Those skilled in the art should understand that the level provided by the power board 30 for the main board 10 can be converted by the DC-DC buck chips 13 so that the various operating level requirements of the processor 11, the reset circuit 12 and the display screen 40 can be met. Consequently, when the DC-DC buck chips 13 break down, the display device cannot work normally. Further, the second circuit 122 can transmit a non-reset signal to the processor 11 according to the fifth level when the DC-DC buck chips 13 are operated normally. The second circuit 122 can transmit a reset signal to the processor 11 according to the fifth level when the DC-DC buck chips 13 cannot operate normally, and thus the problem that the display device cannot operate normally due to failures of the DC-DC buck chips 13 is avoided.

Further, when the display device is in the standby state, some DC-DC buck chips 13 stop operating, the second circuit 122 transmits a reset signal to the processor 11 when receiving the fifth level sent by the DC-DC buck chips 13 at the moment, and malfunction is caused. Therefore, in the embodiments of the disclosure, with reference to FIG. 4, the reset device may further include an anti-reset circuit 14 on the main board 10.

Where, the input terminal of the anti-reset circuit 14 can receive a standby signal from the processor 11 by connecting with the output terminal of the processor 11, so that the anti-reset circuit 14 determines that the display device is in the standby state according to the standby signal. The output terminal of the anti-reset circuit 14 can provide the second circuit 122 with the level required for outputting a non-reset signal by connecting with the input terminal of the second circuit 122 when the anti-reset circuit 14 receives the standby signal.

The specific implementation forms of the anti-reset circuit 14 in the embodiments of the disclosure are not limited. As shown in FIG. 5, in some embodiments, the anti-reset circuit 14 may include an eleventh resistor R11, a fourth triode Q4 and a twelfth resistor R12.

Where a first terminal of the eleventh resistor R11 is an input terminal of the anti-reset circuit 14; a second terminal of the eleventh resistor R11 is connected with a base of the fourth triode Q4; an emitter of the fourth triode Q4 is connected with a fifth preset level U5 which is provided by the power board 30 in the display device; a collector of the fourth triode Q4 is connected with a first terminal of the twelfth resistor R12; and a second terminal of the twelfth resistor R12 is connected with the input terminal of the second circuit 122.

Figure 6:
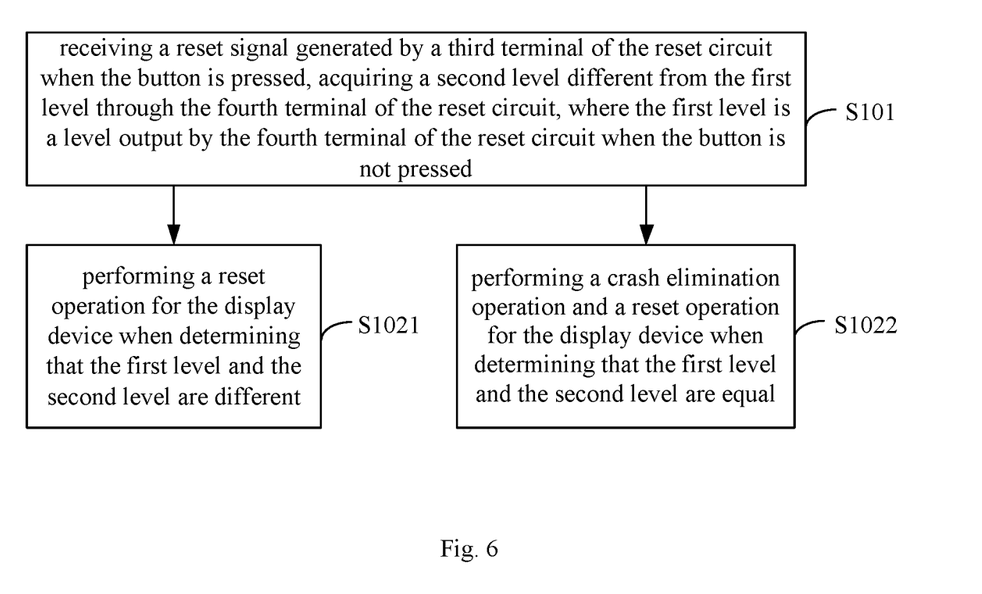
FIG. 6 is a flow diagram of the reset processing method according to some embodiments of the disclosure.

FIG. 6 is a schematic flow diagram of a reset processing method according to the disclosure. The reset processing method can be implemented by software and/or hardware of a processor in the reset device shown in FIGS. 1 to 5. As shown in FIG. 6, the reset processing method of the embodiments of the disclosure may include the following steps.

S101, receiving a reset signal generated by a third terminal of the reset circuit when the button is pressed, acquiring a second level different from the first level through the fourth terminal of the reset circuit, where the first level is a level output by the fourth terminal of the reset circuit when the button is not pressed.

S1021, performing a reset operation for the display device when determining that the first level and the second level are different.

S1022, performing a crash elimination operation and a reset operation for the display device when determining that the first level and the second level are equal.

In some embodiments, the step of performing a reset operation for the display device in S1021 may include the step that: inputting a zero level to the reset circuit, and restarting the display device.

In some embodiments, the step of performing the crash elimination operation and the restart operation for the display device in S1022 may include the steps that: restarting the display device; after the display device is restarted, if it is determined that the first level is the same as the second level, performing a crash elimination operation for the display device until the first level is different from the second level; if the first level is different from the second level, inputting a zero level to the reset circuit, and the display device is restarted.

In some embodiments, the following crash elimination operation is performed on the display device, including the steps that: restoring the initial version of software, uninstalling the incompatible applications, and cleaning up the cache.

The reset processing method according to the embodiments of the disclosure may adopt the execution process of the processor of the foregoing reset device, and the implementation form and the technical effect are similar, and details are not described herein again.

Figure 7:
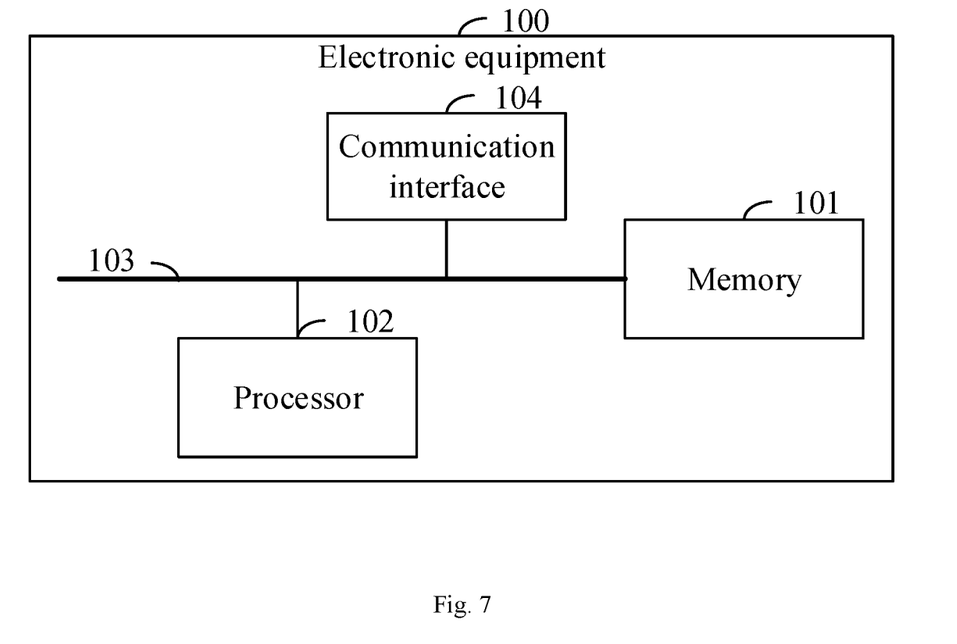
FIG. 7 is a structure schematic diagram of hardware of electronic device according to some embodiments of the disclosure.

FIG. 7 is a structure schematic diagram of hardware of electronic device according to the disclosure. As shown in FIG. 7, the electronic device 100 is used for implementing operations corresponding to the reset device in any of the foregoing method embodiments. In some embodiments, the electronic device 100 may include a memory 101 and a processor 102.

The memory 101 is configured to store computer programs.

The processor 102 is configured to execute the computer programs stored on the memory so as to implement the reset processing method of the above embodiments. The relevant descriptions may be referred to the related descriptions in the above method embodiments.

In some embodiments, the memory 101 can be either independent or be integrated with the processor 102.

When the memory 101 is a device independent of the processor 102, the electronic device 100 may further include a bus 103 configured to connect the memory 101 with the processor 102.

In some embodiments, the electronic device 100 may also include a communication interface 104 which is able to connect with the processor 102 through the bus 103. The processor 102 is able to control the communication interface 104 so that the above-described functions of receiving and transmitting of the electronic device 100 can be implemented.

The disclosure further provides a non-volatile computer readable storage medium including a computer program for implementing the reset processing method in the above embodiments.

Through the embodiments of the disclosure, the problem that the display device cannot work normally during software faults of the processor of the display device through related technologies is solved, the display device including the reset device has the self-checking capability, and the user experience is improved.

In several embodiments according to the disclosure, it should be understood that the disclosed devices and methods may be implemented in other forms. For example, the device embodiments described above are merely illustrative. For example, modules are classified by logical functions, and there may be other forms for module classifications during actual implementation. For example, multiple modules may be combined or integrated into another system, or some features can be neglected or omitted. In addition, mutual coupling or direct coupling or communication connection shown or discussed may be indirect coupling or communication connection through some interfaces, devices or modules, and may also be electrical, mechanical or the like.

The modules described as independent components may or may not be physically separated, and the components as module display may or may not be physical units, that is, the components may be located in one place or may be distributed to multiple network units. Some or all of the modules may be selected as needed in order to achieve the objectives of the embodiments of the disclosure.

In addition, all the functional modules in all the embodiments of the disclosure may be integrated into a processor, or all the modules may exist physically and separately, or two or more modules may be integrated into a unit. The unit formed from the modules can be implemented in the form of hardware or in the form of hardware and software functional units.

The above integrated module implemented in the form of software function modules can be stored in a computer readable storage medium. The software function modules are stored in a storage medium, and include a plurality of instructions for enabling computer device (such as a personal computer, a server or network equipment) or a processor to perform some steps of the methods of all the embodiments of the disclosure.

It should be understood that the above processor may be a central processor (CPU for short), or may be another general processor, a digital signal processor (DSP for short), an application specific integrated circuit (ASIC for short) and the like. The general processor may be a microprocessor, or the processor may be any conventional processor or the like. The steps of the methods disclosed in the application may be directly executed and completed through a hardware processor or executed and completed through a combination of hardware and software modules in the processor.

The memory may include a high speed RAM memory, may also include a nonvolatile memory (NVM), such as at least one disk memory, and may also be a USB flash drive, a mobile hard disk, a read only memory, a magnetic disk or an optical disk.

The bus may be an industry standard architecture (ISA) bus, a peripheral component (PCI) bus or an extended industry standard architecture (EISA) bus. The bus can be an address bus, a data bus, a control bus and the like. For representation purpose, the bus in the figures of the disclosure is not limited to only one bus or one type of bus.

The computer readable storage medium may be implemented by any type of volatile or nonvolatile storage device or a combination of volatile and nonvolatile storage device, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk. A storage medium may be any available medium that can be accessed by a general purpose computer or a special purpose computer.

Those of ordinary skill in the art should understand that all or part of the steps implementing the various method embodiments described above may be completed by hardware related to program instructions. The aforementioned program can be stored in a computer readable storage medium. When the program is executed, the steps including the foregoing method embodiments are executed; and the foregoing storage media includes various media which can store program codes, such as a ROM, a RAM, a magnetic disk or an optical disk.

Finally, it should be noted that the above embodiments are only for explaining the embodiments of the disclosure and are intended to limit the embodiments; although the disclosure has been described in detail with reference to the foregoing embodiments, those skilled in the art should understand that the embodiment described in the descriptions may be modified, or some or all of the technical features may be equivalently replaced; and the modifications or substitutions do not make the essence of the corresponding embodiments depart from the scope of the embodiments of the disclosure.

What is claimed is:

1. A display device, comprising:
    a display screen configured to display an image;
    a main board in connection with the display screen;
    a reset device on the main board, comprising: a processor, a reset circuit, and a button; wherein:
        a first terminal of the processor electrically connects with a first terminal of the reset circuit, a second terminal of the processor electrically connects with a second terminal of the reset circuit, and a third terminal of the reset circuit electrically connects with an output terminal of the button;
        the reset circuit is configured to: upon detecting a press of the button, transmit a reset signal to the first terminal of the processor through the first terminal of the reset circuit;
        the processor is configured to: in response to receiving the reset signal, acquire a second level signal through the second terminal of the processor from the second terminal of the reset circuit; and
        the processor is further configured to: in response to determining a value of a first level signal is different from a value of the second level signal, perform a reset operation for a display device, wherein the first level signal is a signal output from the second terminal of the reset circuit when the button is in an un-pressed state, or in response to determining the value of the first level signal is the same as the value of the second level signal, perform a crash elimination operation and a reset operation for the display device.

2. The display device according to claim 1, wherein:
    the reset circuit comprises a first circuit, a second circuit and a third circuit;
    wherein the first circuit comprises the button;
    an output terminal of the first circuit electrically connects with an input terminal of the second circuit and an input terminal of the third circuit;
    an output terminal of the second circuit electrically connects with the first terminal of the processor; and
    an output terminal of the third circuit electrically connects with the second terminal of the processor.

3. The display device according to claim 2, wherein:
    the first circuit is configured to output a third level signal to the second circuit and the third circuit respectively when the button is not pressed;
    the second circuit is configured to output a non-reset signal to the processor according to the third level signal, wherein the non-reset signal is different from the reset signal in amplitude;
    the processor is configured to acquire the first level signal from the third circuit according to the non-reset signal, wherein the first level signal is generated by the third circuit according to the third level signal;
    the first circuit is configured to output a fourth level signal to the second circuit and the third circuit when the button is in a pressed state;
    the second circuit is configured to output the reset signal to the processor according to the fourth level signal; and
    the processor is configured to acquire the second level signal from the third circuit according to the reset signal, wherein the second level signal is generated by the third circuit according to the fourth level signal.

4. The display device according to claim 3, wherein:
    the third circuit comprises a first resistor, a capacitor, a second resistor, a third resistor, a diode, a first triode, a second triode, and a fourth resistor;
    a first terminal of the first resistor electrically connects with the second terminal of the processor;
    a second terminal of the first resistor electrically connects with a first terminal of the capacitor, an emitter of the first triode, a first terminal of the second resistor, and a first terminal of the third resistor;
    a second terminal of the capacitor is grounded;
    a second terminal of the second resistor electrically connects with a preset level signal;
    a second terminal of the third resistor electrically connects with a base of the first triode, a collector of the second triode and an anode of the diode;
    a base of the second triode electrically connects with a collector of the first triode and a first terminal of the fourth resistor;
    a second terminal of the fourth resistor and an emitter of the second triode are grounded; and
    a cathode of the diode electrically connects with the output terminal of the first circuit.

5. The display device according to claim 3, wherein the processor is further configured to: in response to determining that the value of the first level signal is different from the value of the second level signal, input a zero level signal to the reset circuit and restart the display device.

6. The display device according to claim 3, wherein the processor is further configured to:
    in response to determining the value of the first level signal is the same as the value of the second level signal, restart the display device and perform the crash elimination operation in the display device until the value of the first level signal is different from the value of the second level signal.

7. The display device according to claim 3, wherein the crash elimination operation comprises one or more of: software initial version recovery, incompatible application uninstallation, or cache cleanup.

8. The display device according to claim 2, wherein the processor is further configured to: in response to determining that the value of the first level signal is different from the value of the second level signal, input a zero level signal to the reset circuit and restart the display device.

9. The display device according to claim 2, wherein the processor is further configured to:
in response to determining the value of the first level signal is the same as the value of the second level signal, restart the display device and perform the crash elimination operation in the display device until the value of the first level signal is different from the value of the second level signal.

10. The display device according to claim 2, wherein the crash elimination operation comprises one or more of: software initial version recovery, incompatible application uninstallation, or cache cleanup.

11. The display device according to claim 1, wherein the processor is further configured to: in response to determining that the value of the first level signal is different from the value of the second level signal, input a zero level signal to the reset circuit and restart the display device.

12. The display device according to claim 1, wherein the processor is further configured to:
in response to determining the value of the first level signal is the same as the value of the second level signal, restart the display device and perform the crash elimination operation in the display device until the value of the first level signal is different from the value of the second level signal.

13. The display device according to claim 1, wherein the crash elimination operation comprises one or more of: software initial version recovery, incompatible application uninstallation, or cache cleanup.

14. The display device according to claim 1, further comprising:
a housing and a power board, wherein the power board and the main board are provided inside the housing.

15. The display device according to claim 14, wherein the display screen is provided on an inner surface of the housing, and the power board connects with the main board and the display screen.

16. The display device according to claim 14, wherein the power board is configured to provide power supply for the main board.

17. A reset processing method for a display device, comprising:
upon detecting a press of a button on the display device, receiving, by a processor, a reset signal transmitted from a first terminal of a reset circuit, wherein the display device comprises the processor, the reset circuit and the button, a first terminal of the processor electrically connects with a first terminal of the reset circuit, a second terminal of the processor electrically connects with a second terminal of the reset circuit, and a third terminal of the reset circuit electrically connects with an output terminal of the button;
in response to receiving the reset signal, acquiring, by the processor, a second level signal from the second terminal of the reset circuit; and
in response to determining a value of a first level signal is different from a value of the second level signal, performing, by the processor, a reset operation for the display device, wherein the first level signal is a signal output from the second terminal of the reset circuit when the button is in an un-pressed state; or
in response to determining the value of the first level signal is the same as the value of the second level signal, performing, by the processor, a crash elimination operation and a reset operation in the display device.

* * * * *